United States Patent [19]

Hirsch et al.

[11] 4,215,871

[45] Aug. 5, 1980

[54] HAND HELD COLLET

[75] Inventors: Mordechai Hirsch; Ilan Cohen, both of Nahariya, Israel

[73] Assignee: Vargus Ltd., Nahariya, Israel

[21] Appl. No.: 17,272

[22] Filed: Mar. 5, 1979

[51] Int. Cl.³ ............................................. B23B 31/12
[52] U.S. Cl. ................................... 279/48; 279/46 R; 279/49
[58] Field of Search ............... 279/46 R, 46 A, 50, 279/47, 48, 49, 54, 56, 1 A, 1 ME

[56] References Cited

U.S. PATENT DOCUMENTS

| 160,954 | 3/1875 | Reilley | 279/49 |
|---|---|---|---|
| 184,445 | 11/1876 | Trump | 279/49 |
| 432,180 | 7/1890 | Davis | 279/48 |
| 990,087 | 4/1911 | Whitehead | 279/49 |
| 1,306,354 | 6/1919 | Robbins | 279/49 X |
| 1,362,981 | 12/1920 | Ashley | 279/49 |
| 2,683,931 | 7/1954 | Fahlgren | 279/48 |

FOREIGN PATENT DOCUMENTS

| 109422 | 4/1968 | Denmark | 279/48 |
|---|---|---|---|
| 552442 | 5/1923 | France | 279/48 |
| 107909 | 7/1943 | Sweden | 279/46 |
| 113213 | 2/1945 | Sweden | 279/46 |
| 134076 | 12/1951 | Sweden | 279/50 |
| 309993 | 12/1955 | Switzerland | 279/46 |

Primary Examiner—William R. Briggs
Attorney, Agent, or Firm—Browdy and Neimark

[57] ABSTRACT

A hand-held collet for holding a tool or the like within displaceable jaw pieces which are mounted on sprung rods accommodated within a hollow tubular handle.

2 Claims, 3 Drawing Figures

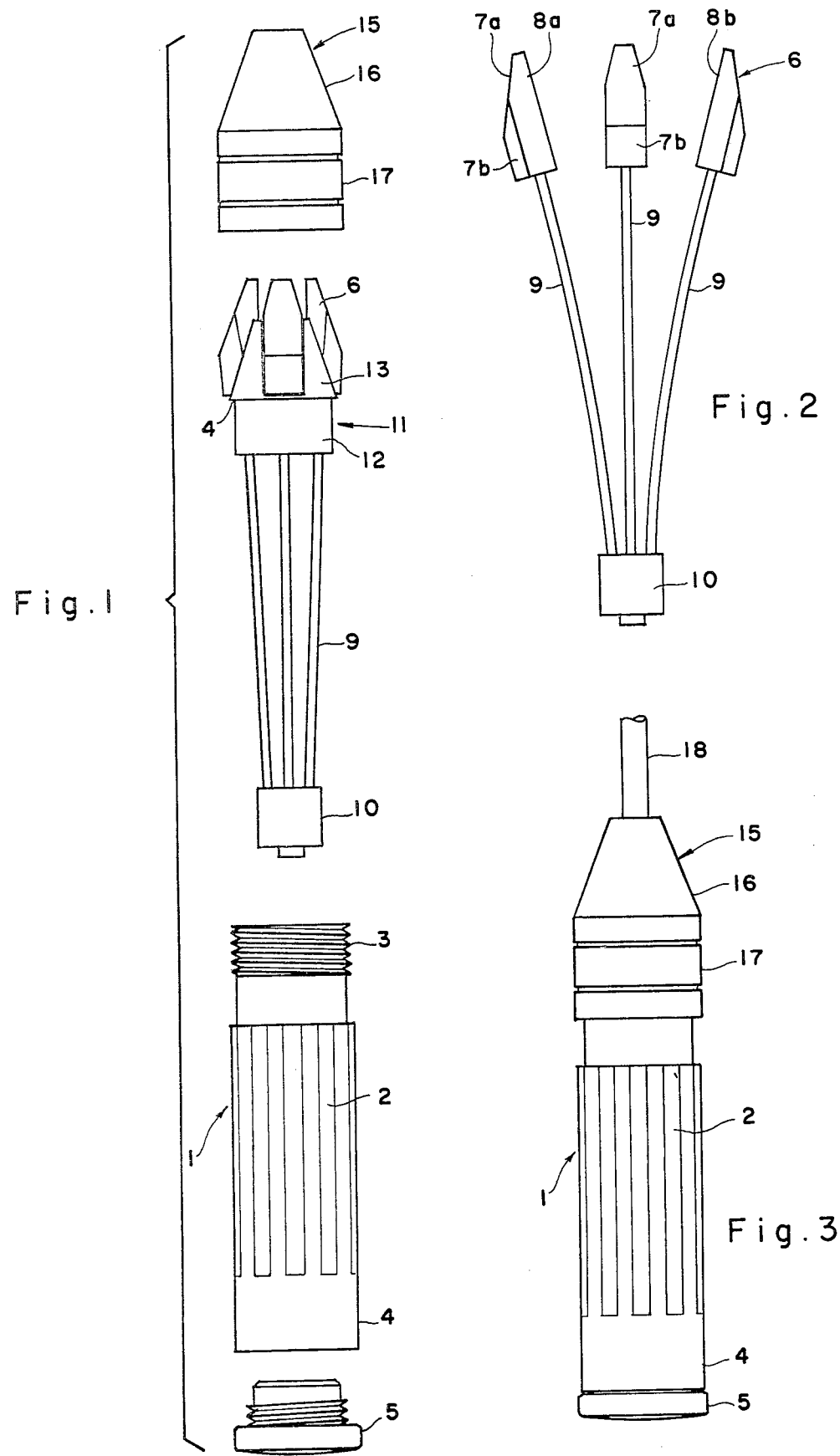

HAND HELD COLLET

This invention relates to a hand-held collet by which is meant a device which allows for the clamping in position and holding by hand of a simple work tool and the like.

According to the present invention there is provided a hand-held collet comprising a hollow tubular handle; a first, externally threaded end portion of said handle; a plurality of jaw pieces; a like plurality of resiliently flexible rods; a rod anchoring block to which a first set of ends of said rods is secured, an opposite set of ends of said rods being secured to said jaw pieces so that said jaw pieces radiate outwardly with respect to said block; a collet collar; a first apertured tapering end portion of said collar; a second opposite internally threaded end portion of said collar; said collet being assembled with said anchoring block and rods disposed within said handle and with said jaw pieces extending beyond the first end thereof into said collar, screw coupling of said collar to said handle resulting in the inward gripping displacement of said jaw pieces against an outwardly directed biasing force exerted by said rods.

Preferably, the collet furthermore comprises an annular member surrounding said rods; a plurality of fixed jaw pieces formed integrally with said member and respectively disposed between said first mentioned jaw pieces, a skirt portion of said member being adapted to be located within said first end portion of said handle and an outwardly directed flange of said member adapted to abut a rim of said first end portion.

With such a hand-held collet in accordance with the present invention the effective mounting and spring biasing of the displaceable jaw pieces is carried out efficiently and economically by the longitudinally disposed spring rods which are accommodated within the tubular handle of the collet.

One embodiment of a hand-held collet in accordance with the present invention will now be described by way of example and with reference to the accompanying drawings, in which:

FIG. 1 is an exploded view of the collet;

FIG. 2 is a elevation of a component of the collet shown in FIG. 1 without a surrounding annular member; and FIG. 3 is a side elevation of the assembled collet shown gripping a tool.

As seen in the drawings, the collet comprises a hollow tubular handle 1 having longitudinal ribbing 2 to facilitate gripping and being formed at one end with an externally threaded portion 3 and having an internally threaded opposite end 4 into which can be screw-fitted a closure cap 5. Three jaw pieces 6 are each formed with an external wall component 7a, which forms part of a conical surface and a wall component 7b which forms part of a cylindrical surface and inner planar wall components 8a and 8b which are formed at an obtuse angle with respect to each other. The jaw pieces 6 are respectively mounted at the end of steel sprung rods 9 whose lower ends are anchored in a cylindrical anchoring block 10 so that the rods 9 and the jaw pieces 6 radiate outwardly with respect to the anchoring block 10.

An annular member 11 has a cylindrical skirt portion 12 and, formed integrally therewith, three fixed jaw pieces 13 which, are respectively located between the jaw pieces 6. The skirt portion 12 is separated from the fixed jaw pieces 13 by an externally directed flange 14.

A collet collar 15 comprises a tapering portion 16 and an internally threaded skirt portion 17.

The collet is assembled as follows:

With the annular member 11 surrounding the rods 9, as shown in FIG. 1 of the drawings, the assembly consisting of the anchoring block 10, rods 9, annular member 11 and jaw pieces 6 are introduced into the handle 1 so that the skirt portion 12 enters the externally threaded end portion 3 and the flange 14 rests on the rim of the end portion 3. The collet collar 15 is then fitted over the juxtaposed fixed and displaceable jaw pieces 13 and 6 and is screwed onto the externally threaded end portion 3. It will be readily seen that the cam action consequent upon the screwing of the collet collar onto the handle 2 causes the displaceable jaw pieces to move inwardly and thereby to grip a tool 18 which has been preliminarily inserted between the jaw pieces.

In this way gripping of the tool can be readily effected whilst upon unscrewing of the collet collar 15 the biasing effect exerted by the sprung rods 9 forces the displaceable jaw pieces 6 apart thereby releasing the tool 18 for ready removal.

As an alternative to the embodiment specifically described above, the collet collar 15 and the annular member 11 may be keyed together or may be coupled to each other or formed as an integral unit so as to rotate together. With this arrangement the rods 9 and block 10 must be free to rotate with respect to the handle 1. The screw rotation of the collar 15 on to the handle 1 results in the effective gripping of a tool.

We claim:

1. A hand held collet comprising a hollow tubular handle; a first, externally threaded end portion of said handle; a plurality of jaw pieces; a like plurality of resiliently flexible rods; a rod anchoring block to which a first set of ends said rods is secured, an opposite set of ends of said rods being secured to said jaw pieces so that said jaw pieces radiate outwardly with respect to said block; a collet collar; a first, apertured, tapering end portion of said collar; a second, opposite internally threaded end portion of said collar; said collet being assembled with said anchoring block and rods disposed within said handle and with said jaw pieces extending beyond the first end thereof into said collar, screw coupling of said collar to said handle resulting in the inward gripping, displacement of said jaw pieces against an outwardly directed biasing force exerted by said rods; an annular member surrounding said rods; and a plurality of fixed jaw pieces formed integrally with said member and respectively disposed between said first mentioned jaw pieces, a skirt portion of said member adapted to be located within said first end portion of said handle and an outwardly directed flange of said member adapted to abut a rim of said first end portion.

2. A collet according to claim 1 wherein there is furthermore provided a screw-on cap for closing a second and opposite end of said handle.

* * * * *